Patented May 2, 1933

1,906,229

UNITED STATES PATENT OFFICE

KARL KELLER, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

NEW CONDENSATION PRODUCTS AND PROCESS OF MAKING SAME

No Drawing. Application filed January 4, 1930, Serial No. 418,667, and in Germany January 12, 1929.

I have found that new condensation products are obtained by acting with solutions of weak alkalies, such as aqueous solutions of ammonia, sodium carbonate, phosphate or acetate, ammonium formate, urea or mixtures of such agents on halogenated derivatives of higher fatty acids, containing more than 8 carbon atoms and more than 2 halogen atoms, particularly such halogenated derivatives as contain 16 to 18 carbon atoms and 4 or more halogen atoms. These substances are obtained by reacting on fatty acids containing more than 4 carbon atoms with such an amount of a halogen that fatty acids containing at least three halogen atoms are obtained and at least one hydrogen atom of the carbon chains is replaced by halogen. The reaction may be advantageously carried out by heating the components at an elevated pressure and by using starting materials containing at least 4 halogen atoms.

The new products thus obtained are, in contradistinction to the products obtainable by the action of strong alkalies or of solutions of ammonia, more or less caoutchouc like, partly plastic materials insoluble in ether, alcohol or benzene. They are chemically indifferent, insoluble in water, dilute acids and alkalies, difficultly soluble or insoluble in ether, alcohol or benzene. When boiled with dilute caustic alkali solutions, they are saponified and partly dissolved.

Probably the formation of the new products is not only due to the substitution of halogen atoms by hydroxyl groups or other residues of the alkaline acting agents used and to the formation of new double bonds by splitting off halogen atoms, but, obviously, by the influence of the weak alkalies a further interaction between the carboxylic acid and other reactive groups, particularly hydroxyl groups takes place with the result of an esterification of the carboxylic acid groups and a condensation or polymerization of several molecules.

In order to further illustrate my invention the following examples are given, the parts being by weight and all temperatures in centigrade degrees, but it is however to be understood, that my invention is not limited to the particular products nor reaction conditions mentioned therein.

Example 1

40 parts of a tetrachloropalmitic acid are heated in an autoclave with 46 parts of an aqueous solution of ammonia (0.909 specific gravity), diluted with 20 parts of water, some hours at about 140–150°. When cooled down the reaction product is isolated by filtration, washed with water and dried. The new product represents a yellowish, tenacious, elastic substance, insoluble in water, dilute acids and alkalies. It is insoluble in organic solvents and may be purified by extraction with, for instance, boiling chloroform or alcohol.

Example 2

48 parts of a pentachlororicinoleic acid are heated in an autoclave with 65 parts of a concentrated aqueous solution of ammonia (density=0.909), diluted with 50 parts of water, for about 5 hours at about 140–150°. After cooling down the reaction product is isolated by filtration, washed with water and dried. The new compound represents a brownish, elastic, caoutchouc like substance, insoluble in water, dilute acids and alkalies, difficultly soluble in organic solvents. It may be purified by extraction with water or organic solvents such as chloroform.

When boiling it for a longer time with a dilute caustic alkali solution, the compound becomes soluble, obviously, due to the saponification of ester groups. By precipitation by means of a dilute acid, a new product of a plastic character is obtained.

Example 3

26 parts of hexachlorinated ricinoleic acid are heated with a solution of 50 parts of potassium carbonate in about 150 parts of water in an autoclave for about 6 hours at about 140–150°. The reaction product is isolated as described in the foregoing examples. It represents an insoluble caoutchouc like substance, which cannot be converted into a soluble form even when boiled with a caustic alkali solution. It represents a particularly highly polymerized product. It may be purified by extraction with alcohol.

Similar products are obtained by replacing the potassium carbonate solution by an aqueous solution of ammonia or secondary sodium phosphate.

When adding a dilute acid to the brownish aqueous solution obtained by the action of potassium carbonate and separated from the reaction product by filtration, a further new compound separates, representing a soft plastic and extensible mass.

*Example 4*

24 parts of hexachlorinated stearic acid are heated with 35 parts of an aqueous solution of ammonia of 0.909 density and 25 parts of water in an autoclave for about 8 hours at about 150–160°. The reaction product represents a tenacious insoluble mass. When boiled with a dilute caustic alkali solution it becomes nearly entirely soluble; thereby a new compound is formed which may be isolated by precipitating it with dilute acids and washing it with water. It represents a soft plastic material being apparently less polymerized than the primary product.

*Example 5*

25 parts of the hexachlorinated ricinoleic acid are heated with 45 parts of ammonium formate and 45 parts of water in an autoclave for 2 hours at about 140–150°. A brownish very extensible material is obtained which may be transformed into a form soluble in dilute alkalies by boiling it with a dilute caustic alkali solution for a longer time. The product isolated therefrom by precipitation with a dilute acid represents a light brown plastic material less extensible than the primary product.

*Example 6*

25 parts of the hexachlorinated ricinoleic acid are heated in an autoclave with 20 parts of urea and 80 parts of water with addition of 0.3 parts of copper powder for 3–4 hours at 110–120°. After separation from the aqueous salt solution a caoutchouc like, still sticky substance is obtained insoluble in organic solvents and not convertible by boiling it with a caustic alkali solution. It may be freed from admixed copper compounds by treatment with a dilute mineral acid and extraction with boiling water. When extracted for a short time with organic solvents for instance with chloroform the viscosity of the product disappears and the product represents a brown caoutchouc like very extensible material.

When heating 25 parts of the hexachlorinated ricinoleic acid with 50 parts of sodium acetate and 50 parts of water in an autoclave for 3–4 hours at 140–150° under a pressure of about 5 atmospheres a caoutchouc like material of a particular extensibility is obtained which may be purified for instance by extraction with chloroform.

*Example 7*

25 parts of the hexachlorinated ricinoleic acid are heated with a solution of 18 parts of urea and 25 parts of anhydrous sodium acetate in about 150 parts of water with addition of 0.3 parts of copper powder for 3–4 hours in an apparatus provided with a reflux condenser. When the reaction is finished the semisolid reaction product is separated from the aqueous solution and washed with alcohol. The product is a soft caoutchouc like somewhat sticky insoluble material not convertible by boiling with a caustic alkali solution; but by this treatment the viscosity of the product disappears and its elasticity is increased. From analysis it appears that it contains nitrogen and probably an acetic acid residue in its molecule.

All compounds described in the foregoing examples are valuable products useful for various technical purposes.

I claim:—

1. A process which comprises heating a halogenated higher fatty acid containing 16 to 18 carbon atoms and at least 4 halogen atoms under elevated pressure with a solution of a weakly alkaline acting agent.

2. As new products condensation products of a more or less caoutchouc like, partly plastic character, being insoluble in water, dilute acids and alkalies, difficultly soluble or insoluble in ether and alcohol as well as in benzene, partly convertible into a soluble form by boiling with a dilute caustic alkali solution, which products are obtainable by heating a halogenated higher fatty acid containing 16 to 18 carbon atoms and at least 4 halogen atoms under elevated pressure with a solution of a weakly alkaline acting agent.

3. As a new compound a condensation product representing an insoluble caoutchouc like substance, insoluble in water, dilute acids and alkalies, insoluble in ether and alcohol as well as in benzene and not convertible by boiling with a dilute caustic alkali solution, which product is obtained by heating a hexachlorinated ricinoleic acid with a solution of a weakly alkaline acting agent under elevated pressure.

In testimony whereof, I affix my signature.

KARL KELLER.